United States Patent [19]

Spencer

[11] 4,074,908
[45] Feb. 21, 1978

[54] DOUBLE ACTING DYNAMIC SEAL WITH E-SHAPED SPRING AND L-SHAPED SEALS

[75] Inventor: Stanley E. Spencer, Palos Verdes Estates, Calif.

[73] Assignee: The United States of America as represented by the Secretary of the Air Force, Washington, D.C.

[21] Appl. No.: 776,039

[22] Filed: Mar. 9, 1977

[51] Int. Cl.² .......................................... B65D 53/00
[52] U.S. Cl. ............................... 277/44; 277/48; 277/164; 277/165; 277/194; 277/DIG. 6
[58] Field of Search ............... 277/DIG. 6, 44–49, 277/35, 50, 51, 61, 62, 40, 41, 154, 138, 157–159, 164, 165, 194, 198, 199, 207 R, 211, 225, 143, 96, 84, 123–125, 148, 163

[56] References Cited

U.S. PATENT DOCUMENTS

| 701,730 | 6/1902 | Irons | 277/163 |
|---|---|---|---|
| 983,201 | 1/1911 | Brussard | 277/44 |
| 2,350,697 | 6/1944 | Petch | 277/49 |
| 3,099,454 | 7/1963 | Walinski | 277/47 |

FOREIGN PATENT DOCUMENTS

| 354,105 | 6/1922 | Germany | 277/163 |

*Primary Examiner*—Robert S. Ward, Jr.
*Attorney, Agent, or Firm*—Joseph E. Rusz; Arsen Tashjian

[57] ABSTRACT

A relatively small bidirectional polymeric piston seal especially useful for cryogenic refrigerators having an E-shaped metallic spring retainer and two wound spring seal expanders positioned between two L-shaped polymeric seals. The L-shaped design permits the use of conventional tooling with high strength abrasive polymeric compounds while maintaining tighter tolerances during manufacture thereby keeping frictional resistance at a uniform level to produce longer wear life at the required high pressure forces in two directions.

3 Claims, 4 Drawing Figures

DOUBLE ACTING DYNAMIC SEAL WITH E-SHAPED SPRING AND L-SHAPED SEALS

STATEMENT OF GOVERNMENT INTEREST

The invention described herein may be manufactured and used by or for the Government for governmental purposes without the payment of any royalty thereon.

BACKGROUND OF THE INVENTION

This invention relates to a bidirectional polymeric piston seal and, more particularly, the invention is concerned with providing a piston seal assembly that includes an E-shaped metallic spring retainer, two wound spring seal expanders and two L-shaped polymeric seals.

Heretofore, it has been common practice to provide the piston on a cryogenic refrigerator with a seal assembly which includes two C-shaped seals assembled together in a seal holder "back-to-back". These seals, because of the C-shaped design, can only be fabricated from easily machinable polymeric compounds in the small, 1/32 inch, cross sections. Because they cannot be machined from the high strength abrasive polymeric compounds, they do not have the wear life or uniform frictional resistance required for most cryogenic refrigerator applications.

The conventional C-shaped seal in the small cross sections must have the cup sections machined with a carbide tipped tool that is typically 0.010 inches wide and has a very long length dimension as compared with its width. Extreme temperatures are generated at the tip of the tool when abrasive polymeric materials have to be machined. This results in extreme tool wear such that seals in the 1/32 inch cross section cannot be manufactured economically and to close dimensional tolerances.

Thus, it would be most desirable to provide a bidirectional, polymeric piston seal assembly for a cryogenic refrigerator wherein the seal can be fabricated in the small cross section out of any of the polymeric compounds without undue tool wear and within the close dimensional tolerances required.

SUMMARY OF THE INVENTION

The present invention is concerend with providing a small, bidirectional polymeric piston seal capable of sealing against high pressure forces in two directions while giving long wear life with uniform frictional drag. The seal can be machined in the small cross-section sizes from abrasive polymers with conventional tools at a minimum of tool wear to very close tolerances.

Accordingly, it is an object of the invention to provide a double acting dynamic seal wherein the sealing function operates against high pressure forces in two directions.

Another object of the invention is to provide a bidirectional, polymeric piston seal that gives long wear life with uniform frictional drag.

Still another object of the invention is to provide a double acting dynamic seal which is capable of being economically machined in small cross-section sizes with conventional tooling.

A further object of the invention is to provide a bidirectional, polymeric piston seal wherein frictional drag can be kept more uniform because the seals can be machined to tighter tolerances.

A still further object of the invention is to provide a double acting dynamic piston seal which includes L-shaped polymeric seals allowing a machine tool of large width dimension to be used so that the heat generated during the cutting process can be easily conducted away thereby keeping tool wear to a minimum.

These and other objects, features and advantages will become more apparent after considering the following detailed description taken in conjunction with the annexed drawings and appended claims.

DETAILED DESCRIPTION OF A PREFERRED EMBODIMENT

Figure 1:
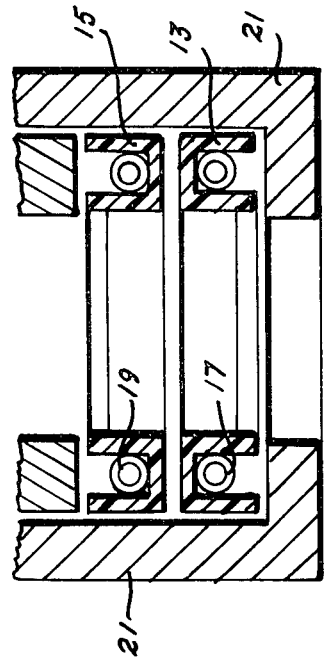
FIG. 1 is a cross-sectional view of a prior art conventional C-shaped piston seal assembly with the piston removed showing the back-to-back relationship of the seals.
Figure 2:
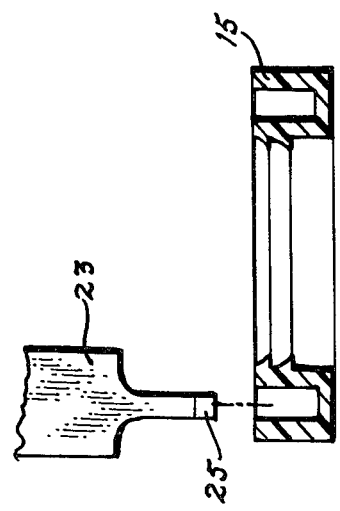
FIG. 2 is a view of the carbide tipped machine tool needed to form the C-shaped prior art piston seal showing the long thin working end portion.

Referring now to the drawings, the conventional prior art dynamic piston seal shown in FIG. 1 includes two C-shaped seals 13 and 15 in a back-to-back relationship to one another. Each of the C-shaped seals 13 and 15 are provided with a wound spring seal expander 17 and 19, respectively, which function to maintain a steady pressure of the seals 13 and 15 against the inner wall of the seal holder 21. In FIG. 2, there is shown a machine tool 23 having a carbide tip 25 thereon for machining the C-shaped groove in the C-shaped seal 15. In the conventional C-shaped seal 15, the small cross sections require that the tool 23 be typically 0.010 inches wide and have a very long length dimension as compared to its width. Extreme temperatures are generated at the tip 25 of the tool 23 when abrasive polymeric materials have to be machined. This results in excessive tool wear such that the seals 13 and 15, being 1/32 inches in cross section, cannot be manufactured economically and to close dimensional tolerances.

Figure 3:
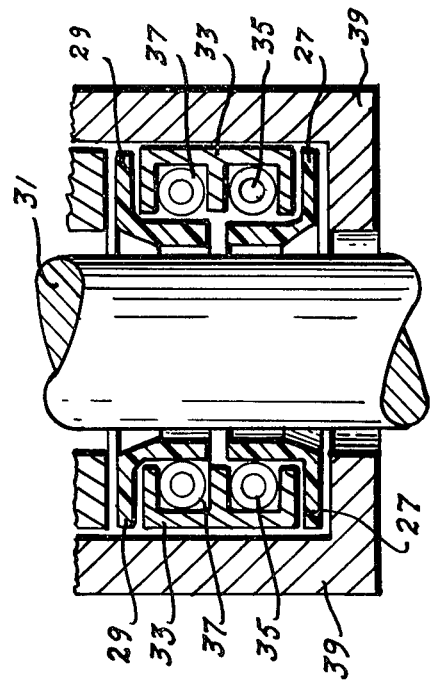
FIG. 3 is a cross-sectional view of a piston seal assembly according to the invention showing the L-shaped piston seals and the E-shaped spring retainer in which the seal expanders are positioned.

In the double acting seal according to the invention as depicted in FIG. 3, two L-shaped seals 27 and 29 are positioned around the piston 31. In the interest of providing extended wear life, the seals 27 and 29 are preferably fabricated from an abrasive polymeric compound, for example, 15% glass filled Teflon. An E-shaped metallic spring retainer 33 engages the horizontal leg of each of the L-shaped seals 27 and 29 and is positioned therebetween. Each of the L-shaped seals 27 and 29 is provided with a wound spring seal expander 35 and 37, respectively, positioned between the upright leg of the L-shaped seals 27 and 29 and the E-shaped spring retainer 33. The entire double acting dynamic piston seal assembly is pushed into the seal holder 39 and then clamped into place.

Figure 4:
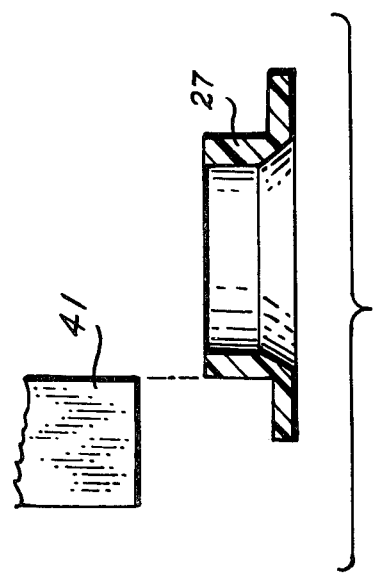
FIG. 4 is a view of the large width dimension machine tool used to form the L-shaped seal according to the invention which allows the tool to be made of ordinary tool steel.

In FIG. 4, there is shown a machine tool 41 having a large width dimension as compared with its length for cutting the L-shaped seal 27 to shape. Wear on the tool 41 is kept to a minimum because the heat generated during the cutting process is easily conducted away. The tool 41 can be ordinary tool steel and still be capable of shaping high strength abrasive polymeric compounds to very close tolerances without undue wearing of the tool.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made, particularly with respect to the shape and positioning of the various elements without departing from the true spirit and scope of the appended claims. For example, although the piston seal is especially useful in modified cryogenic refrigerators, it can be seen that the hereinbefore described seal assembly would be useful in many instances where a dynamic seal which seals equally well in two directions and must be of very small cross section is required.

Having thus set forth the nature of my invention, what I claim and desire to secure by Letters Patent of the United States is:

1. A double acting dynamic piston seal assembly for use with a cryogenic pump and the like, said seal assembly comprising a seal holder, a piston movable through said seal holder, two L-shaped seals positioned around said piston with their vertical legs adjacent the piston, said L-shaped seals having the free end of each vertical leg adjacent the other and the horizontal legs extending outwardly away from said piston, an E-shaped spring retainer positioned between the outwardly extending horizontal legs of said L-shaped seals and said seal holder, the legs of said E-shaped spring retainer extending inwardly toward said piston and engaging the horizontal legs of said L-shaped seals, and a pair of wound spring seal expanders positioned between the inwardly extending legs of said E-shaped spring retainer and between the vertical legs of said L-shaped seals and the upright portion of said E-shaped spring retainer thereby providing a piston seal assembly capable of sealing under the required high pressure conditions.

2. The double acting dynamic piston seal assembly defined in claim 1 wherein said L-shaped seals are fabricated of a high strength abrasive polymeric compound to provide longer wear life and keep frictional resistance at a uniform level.

3. The double acting dynamic piston seal assembly defined in claim 2 wherein said high strength abrasive polymeric compound is 15% glass filled tetrafluoroethylene.

* * * * *